April 13, 1943.  H. KOPP  2,316,341
QUICK RE-RING PISTON
Filed Nov. 15, 1941
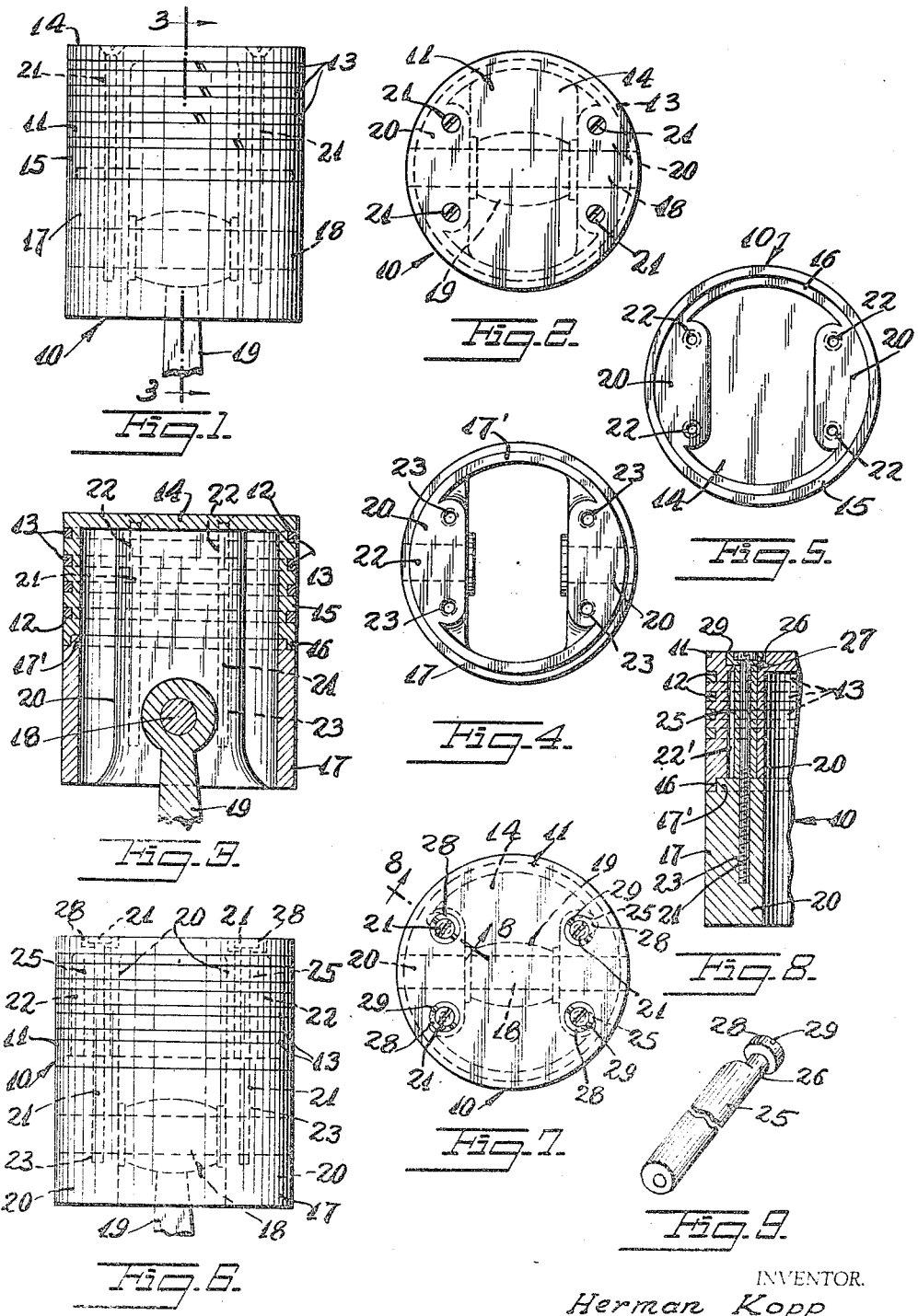
INVENTOR.
Herman Kopp
BY
ATTORNEY Patented Apr. 13, 1943

2,316,341

UNITED STATES PATENT OFFICE 2,316,341

QUICK RERING PISTON

Herman Kopp, Bronx, N. Y.

Application November 15, 1941, Serial No. 419,231

3 Claims. (Cl. 309—15)

This invention relates to new and useful improvements in a quick re-ring piston.

More specifically, the invention proposes the construction of a quick re-ring piston characterized by a piston formed of separate superimposed members with one of said members being provided with the piston rings and the other with the conventional wrist pin arranged in a manner to connect the piston with the connecting rod.

Still further it is proposed to connect together the members of the piston in such a manner that the top member thereof may be removed from the bottom member without necessitating the complete disengagement of the piston from the connecting rod to permit the top member to be removed when it becomes necessary to change the piston rings.

Still further it is proposed to characterize the connecting means by long screws passed through the top wall of the top member and freely engaged through bosses formed in said top member and threadedly engaging aligned bosses formed in said bottom member in a manner to securely attach these members.

According to a modification of the invention it is proposed to provide a means for wedging the fastening elements securely in position to eliminate vibration and cause the members of the piston to be securely connected together.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a piston constructed in accordance with this invention.

Fig. 2 is a plan view of Fig. 1.

Fig. 3 is a vertical sectional view taken on the line 3—3 of Fig. 1.

Fig. 4 is a top plan view of the cylindrical base member.

Fig. 5 is a bottom plan view of the cylindrical head member.

Fig. 6 is a view similar to Fig. 1 but illustrating a modification of the invention.

Fig. 7 is a plan view of Fig. 6.

Fig. 8 is a vertical sectional view taken on the line 8—8 of Fig. 7.

Fig. 9 is a perspective view of one of the wedging means, per se.

The quick re-ring piston, according to this invention, comprises a piston 10 having a cylindrical head member 11 which is circumferentially grooved at points 12 so as to receive the conventional piston rings 13. The cylindrical head member is provided with a top wall 14 and a depending skirt wall 15 provided at its bottom end with a recessed area 16.

The piston 10 further includes a hollow cylindrical base member 17 which is provided with the usual wrist pin 18 for connecting the piston 10 to the top end of a connecting rod 19 which is in turn connected to the conventional crank shaft, not shown on the drawing. The top end of the hollow cylindrical base member 17 is provided with an upwardly extending reduced portion 17' engaged into the reduced area 16 of the head member 11 for the purpose of aligning the adjacent ends of the head member 11 and the base member 17.

Fastening elements are mounted through the top wall 14 of the head member 11 and are connected with the base member 17 for releasibly connecting these members together. At oppositely disposed points the inside faces of the members 11 and 17 are provided with superimposed aligned bosses 20. The fastening elements comprise long screws 21 which are freely projected through openings 22 formed in the bosses 20 of the head member 11. The bottom ends of the screws 21 engage into complementary threaded openings 23 formed in the bosses 20 of the base member 17. The openings 23 are formed in an aligned position with the openings 20.

The operation of this form of the invention is as follows:

The piston 10 when assembled is in the position as shown in Fig. 1. When it becomes necessary to change the rings 13 of the piston it is merely necessary to remove the head of the engine block and turn the crank shaft in a manner to cause the top walls of the pistons 11 to be successively lifted into a flush position with the top face of the engine block. It is then possible to remove the screws 21 and lift the head member 11 out of the engine block without removing the oil pan and disconnecting the complete piston and connecting rod from the crank shaft. In the removed position of the head member 11 it is possible to change the piston rings 13 and re-engage the head member 11 into the engine block and return the screws 21 for securely reattaching the head member to the base member 17.

According to the modification of the invention shown in Figs. 6 to 9 the construction of the quick re-ring piston is similar to that previously described, except for the provision of a means within the head member 11 for securely wedging each of the screws 21 fixedly in position to prevent relative vibration between the various parts.

In this form of the invention the bosses 20 of the head member 11 are formed with enlarged openings 22' through which the screws 21 project. Tubular cams 25 are extended through the enlarged openings 22' and have the screws 21 passed eccentrically therethrough. The cams 25 are provided with reduced neck portions 26 extended through complementary reduced openings 27 formed in the top wall of the head member 11. Heads 28 are provided for the cams 25 and are mounted on the reduced neck portions 26. These heads 28 encircle the heads of the screws 21 and are provided on oppositely disposed sides with grooves 29. These grooves 29 are adapted to be engaged by a forked turning tool for the purpose of turning the cams 25 independently of the screws 21. When a turning tool is engaged with the grooves 29 it is possible to turn the cam 25 to cause it to engage against one wall of the enlarged opening 22' and to force the cams to tightly bear against one side of the screws 21 and lock the screws 21 to the head member 11 to prevent relative vibration.

In other respects this form of the invention is identical to the previous form and like parts are indicated by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A quick re-ring piston, comprising a cylindrical head member circumferentially grooved for the piston rings and having integral top wall and skirt wall portions, a hollow cylindrical base member for the usual wrist pin and connecting rod, and fastening elements mounted through said top wall and connected with said base member for releasably connecting said members together, and means for wedging said fastening elements against said head member, said means comprising cams eccentrically mounted on said fastening elements and adapted to be engaged against portions of said head member.

2. A quick re-ring piston, comprising a cylindrical head member circumferentially grooved for the piston rings, a hollow cylindrical base member provided with the usual wrist pin and connecting rod, aligned bosses formed on the inside faces of said members, screws freely projected through enlarged openings formed in the bosses of said head member and threadedly engaging complementary openings in the bosses of said base member securing said head member in position on said base member, eccentric cams rotatively mounted on said screws within the enlarged openings in the bosses of said head member, and means to facilitate the manual rotation of said cams relative to said screws to cause said cams to bear against an adjacent wall of the enlarged openings in the bosses of said head member wedging said cams between said bosses and screws to prevent vibration.

3. A quick re-ring piston, comprising a cylindrical head member circumferentially grooved for the piston rings, a hollow cylindrical base member provided with the usual wrist pin and connecting rod, aligned bosses formed on the inside faces of said member, screws freely projected through enlarged openings formed in the bosses of said head member and threadedly engaging complementary openings in the bosses of said base member securing said head member in position on said base member, eccentric cams rotatively mounted on said screws within the enlarged openings in the bosses of said head member, and means to facilitate the manual rotation of said cams relative to said screws to cause said cams to bear against an adjacent wall of the enlarged openings in the bosses of said head member wedging said cams between said bosses and screws to prevent vibration, comprising circular heads formed on the top ends of said eccentric cams and engaging about the heads of said screws to be gripped and turned for turning said cams independently of said screws.

HERMAN KOPP.